March 27, 1962     K. H. J. MEDIN     3,027,332
HEAT RESISTING MATERIALS AND METHODS FOR THEIR MANUFACTURE
Filed Nov. 8, 1960
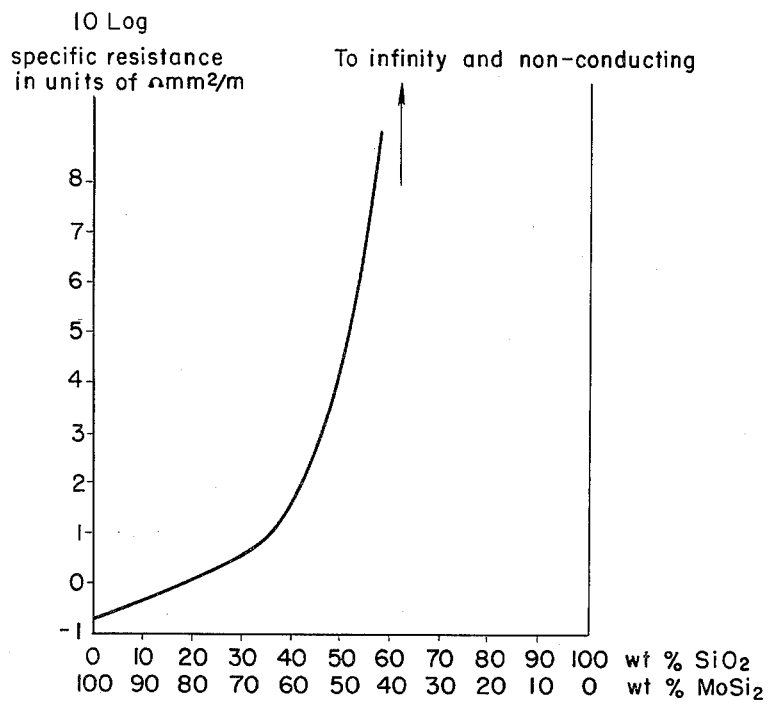
INVENTOR.
KARL HERBERT JOACHIM MEDIN
BY
his ATTORNEYS.

3,027,332
HEAT RESISTING MATERIALS AND METHODS FOR THEIR MANUFACTURE
Karl Herbert Joachim Medin, Lidingo, Sweden, assignor to Aktiebolaget Kanthal, Hallstahammar, Sweden, a corporation of Sweden
Filed Nov. 8, 1960, Ser. No. 67,988
Claims priority, application Sweden June 10, 1953
9 Claims. (Cl. 252—520)

This application is a continuation-in-part of the application Serial No. 657,058, filed on May 6, 1957, and being a continuation-in-part of the application Serial No. 388,-444, filed on October 26, 1953, now abandoned, and relates to heat resisting materials the chief constituents of which are silicides and oxides, and it further concerns powder metallurgical processes for manufacturing such materials.

Such materials must have a high degree of resistance to oxidation which necessitates a relatively low porosity. The materials must have sufficient mechanical strength and not be unduly brittle in order to permit normal handling at room temperature and in order to withstand conventional service conditions. As will be hereinafter described, the foregoing characteristics of the materials will vary with the compositions thereof.

Some of the materials made according to the present invention are particularly suitable as electrical resistances to be used at high temperatures. For such materials it is important that they possess suitable electrical resistance characteristics.

In a material consisting of a conductor, such as a silicide, and ceramic constituents such as $SiO_2$, the conductivity of the material will decrease with increasing percentages of the ceramic constituents. At contents of 70% to 80% by weight of the ceramic constituents, the material will no longer be conductive since direct electrical contact between silicide granules is substantially completely interrupted by the presence of the non-conductive ceramic granules.

At low temperatures, the conductivity appears to depend substantially entirely on the electrically conducting silicide component. The condition becomes different at high temperatures, i.e., above 800 to 1000° C. At such temperatures most ceramic materials have a certain degree of conductivity which increases rapidly with increasing temperature in these ranges.

These conditions result in the fact that the conductivity of materials composed essentially of silicide and ceramic materials have pronounced maximum values at certain temperatures and pronounced minimum values at other temperatures. This results in considerable difficulty in the utilization of such materials and gives rise to the necessity of providing material of definite composition ranges for use in specific applications as will be hereinafter more fully described.

According to this invention, the improved heat resistant material is composed esentially of a silicide component constituting from 35 to 99% by weight of the material and an oxide component, constituting 1 to 65% by weight of the material and consisting of silica and, if desired, of one or more of the oxides $Al_2O_3$, $BeO$, $ZrO_2$, $Y_2O_3$ and/or oxides or other rare earth metals. The oxide component may also contain small quantities of oxides of the metal atoms included in the silicide component. The silicide component consists of one or more silicides of the average formula $MSi_x$ in which M is one or more of the metal atoms Mo, Cr, V, Ti, Zr and Ta and $x$ being from 0.6 to 2. The three remaining metals of the so called transition metals in groups IV, V and VI of the periodic system, i.e. W, Nb and Hf, afford great similarities with Mo, Ta and Zr respectively in that the properties of the material will not be considerably affected if they are included amongst the other metal atoms. However, the metal Hf is very expensive and difficult to obtain so that it would scarcely be a practical proposition to use it. The metals W and Nb are less advantageous and more expensive than Mo and Ta respectively. However, unless stated to the contrary, whenever Mo, Ta and Zr are mentioned, also W, Nb and Hf respectively may be included. In the oxide component the silica content may be from 1 to 60% by weight of the material and, if there is any other oxide or oxides, this or these respectively may constitute totally 0 to 60% by weight of the material.

It is a known fact that certain metal ions, particularly those of Mo and W, reduce the surface tension of certain ceramic masses considerably. Certain other metal ions, such as those of vanadium, have a similar influence although much weaker. In sintering of objects containing molybdenum silicide a small portion of the silicide will be oxidized, molybdenum ions then being formed which are solved in the silica formed at the same time in the oxidation process. A similar solution of molybdenum ions is assumed to take place in sintering cerametallic compositions of molybdenum silicide and an oxide component containing silica. An essential feature in our patent application Ser. No. 388,444 is that the sintering is facilitated by the silica being present in the powder metallurgical manufacture of heat resistant materials containing a silicide component and an oxide component. It is mentioned also in our said application that an addition of such substances which lower the melting point or reduce the surface tension of silica, will facilitate this sintering-promoting function of the silica to a high degree. To the silica, molybdenum ions may be supplied in two principally different ways, i.e. the one consisting in oxidizing the silicide component and the other in adding, to the oxide component, before starting the powder metallurgical manufacture, molybdenum oxide or other suitable molybdenum compound. Molybdenum is, however, a weakly positive metal and it is thus self-evident that in oxidizing a silicide component, containing in addition to molybdenum also a more positive metal, such as titanium, the appearance of molybdenum ions in the oxide components will be more or less suppressed. Before all, this will occur when the more positive silicide component is solvable in silica, such as in the case of $TiO_2$. On the other hand, chromium oxide is not soluble in silica and the presence of chromium in the oxide component does thus not disturb, to any appreciable degree, the oxidation of the molybdenum silicide into molybdenum ions and silica (compare Example 7 given below).

It has now been found in practice that if the silicide component includes a quantity of molybdenum being essentially less than from 50 to 60% by weight of the silicide component the concentration of molybdenum ions will be reduced in the oxide component and the action of these ions to lower the surface tension for the silica correspondingly weakened whereby the sintering of the heat resistant material will no more be sufficiently facilitated. In such a case it will be necessary to supply molybdenum oxide to the silica in the raw material, preferably in a preparatory step of melting or sintering. In Example 10 cited below there is included as a silicide component 8% Ti, 56% Mo and 36% Si. In the oxidation during the final sintering there are formed about ten parts $SiO_2$ which constitute the oxide component of the material together with five parts $Al_2O_3 + 25$ parts $SiO_2$ containing traces of $MoO_3$ originally added. The silica formed in the oxidation of the silicide component will also include traces of oxides of Ti which, due to its stronger positive character, will suppress those Mo ions which otherwise would have appeared in the silica layer around the silicide grains. For this reason it will be necessary in Example 10 to introduce a surplus of Mo ions in the oxide component already from the beginning in order to obtain such a reduction in the surface tension of $SiO_2$ that will favor the sintering process. Further, the sintering may be facilitated in another way, for instance, by producing a liquid phase in the sintering process. In the systems Ti—Si and Zr—Si it is known that there are low melting eutectics. In the system Ti—Si there are two such eutectics corresponding to 8.5 and 78% by weight of Si both having a melting point of 1330° C. The presence of such an easily fusible silicide component may, to a certain degree, form a substitute for the molybdenum ions which would otherwise assist the function of the silica by their reduction of the surface tension.

In the Example 8 below there is a molybdenum silicide poor in Si combined with a low melting titanium silicide rich in Si so that the composition of the silicide component corresponds to a mixture of disilicides

$$(Ti_{0.27}Mo_{0.73})Si_2$$

As stated above, also vanadium ions have a similar influence on the surface tension of the silica and it will be possible, as seen from the Example 5 below, to sinter a material containing solely vanadium silicide and silica into dense products without any particular addition of molybdenum ions.

In Example 11 below there is also included vanadium silicide but due to the higher oxide content a further oxide must be added in the form of $MoO_3$ for the purpose of reducing the surface tension.

Oxide components in products according to the invention may, as above stated, contain in addition to silica one or more of the oxides BeO, $Al_2O_3$, $ZrO_2$ and rare earths. Said oxides may be combined in a way well known for a man skilled in the art of ceramics and it is possible to manufacture oxide components having particularly advantageous properties. Due to its very good resistance against temperature fluctuations and its low specific weight beryllium oxide is used in certain ceramic combinations known before. In Example 4 below there is included, in addition to a small quantity of pure silica favoring the sintering, a ceramic component which is well known as a heat resisting material under the commercial designation "4811 C." The composition hereof corresponds to the formula $48BeO—2Al_2O_3—ZrO_2$ together with a small quantity of CaO. This ceramic component is preferably manufactured in advance in known manner through reaction between the oxides included. Both zirconium oxide and zirconium silicate have good heat resistivity but less favorable resistivity against temperature changes so that products having high contents of these oxides, such as according to Example 6, should thus not be applied in cases where intense fluctuations of temperature occur. Aluminium oxide, such as corundum, has good mechanical strength and also a very high degree of hardness and is suitable as grinding means.

Oxide components consisting of a preponderant portion of silica glass, such as according to the Examples 10 and 11, obtain a good resistivity against temperature fluctuations due to the low thermal expansion coefficient of the silica.

The silicide component may include silicides having 37½–66⅔ atomic percent Si which may also be written $M_5Si_3$ to $MSi_2$ in which M is a transition metal. The disilicides have the advantage of having a high resistivity against oxidation attacks whereas the silicides $M_5Si_3$ have a higher thermodynamic stability which appears, inter alia, therein that they do not react quite as easy with, for instance, oxides as the disilicides do. In its special class $MoSi_2$ has the highest resistivity against oxidation attacks whereas $TaSi_2$, due to its high melting point of 2400° C. and a certain plastic workability imparts toughnesss and high mechanical strength to products having a high content of tantalum silicide, such as in Examples 11 and 12 below.

The size of grain for material according to the invention should be small, preferably less than about 10 microns. Before all this relates to the silicide component which could not be made to sinter to a low porosity if the grains are too coarse. Generally it is advantageous to make also the ceramic component with a grain size being less than 20 microns. In this connection the statement that the size should be less than 10 microns means that 90% by weight of the material has a grain size less than 10 microns.

As regards the porosity of the final product it is advantageous to have a porosity as low as possible. The present invention is not restricted to the porosity being below 10% by volume. It is, however, self-evident that both mechanical strength and resistivity against oxidation attacks will suffer if the porosity becomes too high, particularly if the portion of throughgoing pores becomes high.

Products according to the invention may find many practical applications. As structural parts (compare Examples 11 and 12) in apparatus and machines in which a high resistivity against oxidation attacks in combination with a high heat resistance are desirable such materials may be used particularly for the temperature range of 1.000–1.400° C.

As electric resistance elements for the generation of high temperatures up to 1700° C. those materials are particularly suitable in which the silicide component substantially contains Mo, Ti, V or W, such as in Examples 7 and 10. It is particularly advantageous for the resistance element to use materials the silicide component of which consists of $MoSi_2$ and the oxide component of which consists of $SiO_2$ and $Al_2O_3$. Such compositions afford a good resistivity to heat and have satisfactory electrical properties. They will be treated in another connection. Through the addition of such oxides which are electrically insulating also at high temperatures, such as $SiO_2$, $Al_2O_3$ and BeO the specific resistance may be increased at will and by the addition of certain other disilicides, such as those of Cr, Ti and Ta, also the temperature coefficient of the resistance may be varied from a positive to a negative value which may be very useful for special purposes.

It is also possible to use material according to the invention for cold resistances, for instance, in case only an ohmic resistance without the generation of heat is desired.

Further, the material may be used in cathodes and in many other applied fields of electrotechnics.

Such materials which have hard oxide components, for instance, of corundum are suitable as abrasives, compare Example 13, and they can further be applied as protecting tubes for thermo-elements (Example 10) and in certain cases also as such elements proper and further, in the chemical industry, as containers of different kinds, such as crucibles, muffles (Example 5) and tubes (Example 9) and nozzles which all must be resistant to corrosion and heat fluctuations.

As stated above some of the materials according to this invention are applicable in electrical resistor adapted for very high temperatures. In respect of such materials the silicide component consists substantially entirely of $MoSi_2$. However, the addition of small quantities of $TaSi_2$ and $TiSi_2$, i.e., up to 10% by weight of the silicide component, have been found to improve the mechanical strength of the material and to have a favorable influence on the electrical properties of the material as will be hereinafter described.

The oxide component is composed of $SiO_2$ with or without the addition of $Al_2O_3$ in quantities hereinafter set forth.

Materials having silicide and oxide components have been found to be particularly suitable for use as electrical resistance materials at temperatures ranging between 1400° C. to 1700° C. It will be evident that such materials must have extremely high resistance to oxidation attacks. $MoSi_2$ is the most resistant of the silicides and the addition of any substantial quantity of other silicides reduces the oxidation resistance of the material. However, as previously noted, small additions of $TaSi_2$ and $TiSi_2$ improve the mechanical strength of the material and the temperature coefficient of electrical resistance of the material. For pure $MoSi_2$ the specific electrical resistance is 0.4 ohm mm.$^2$/m. at 20° C.,
1.9 ohm mm.$^2$/m. at 800° C., and
3.0 ohm mm.$^2$/m. at 1600° C., whereas the corresponding values for $MoSi_2+10\%$ $TiSi_2$ are 1.1, 2.2, and 3.0 ohm mm.$^2$/m. respectively. If higher contents, i.e., above 10%, of such other silicides are included in addition to $MoSi_2$ the ability to endure violent temperature changes is substantially reduced.

As previously noted, most ceramic materials become conductive at elevated temperatures, and $MoSi_2$ at temperatures between 1500° C. and 1700° C. has only a small positive temperature coefficient of electrical resistance, i.e., at 1500° C. 2.9 and at 1700° C. 3.1 ohm mm.$^2$/m. It is, therefore, important that any oxide added does not have a pronounced negative coefficient of electrical resistance since the resulting temperature coefficient of the material may be negative. Materials having such negative characteristics at operating temperatures are not suitable as electrical resistance materials and the present invention is thus concerned only with oxides having low electrical conductivity even at high temperatures. Thus, only $SiO_2$ and $Al_2O_3$, which do not have a pronounced negative coefficient of electrical resistance, are employed for the production of electric resistance materials. Furthermore, both of these oxides have exceedingly low conductivity even in these elevated temperatures.

In addition to the foregoing, $SiO_2$ has a further desirable effect of facilitating the sintering of the grains of material forming the silicide and oxide components as will be hereinafter described. The $Al_2O_3$ is additionally desirably employed for the reason that it has a coefficient of linear thermal expansion which agrees exactly with the coefficient of expansion of $MoSi_2$ at temperatures between 20 and 1500° C.

It has been found that at least 90% of all of the silicide and oxide particles before sintering must have a grain size less than 10 microns if a product of suitable high density and low pore volume is to be obtained. The relative pore volume should not exceed 10% if the resulting product is to have good mechanical strength and sufficient resistance to oxidation. In the sintering process there is always a certain amount of grain growth, particularly if the quantity of oxide material is small. If higher contents of oxide material are employed, for example over 20%, the grain growth will be insignificant in sintering, and after long periods of use of the final product at high temperatures the grain growth will not exceed 20 to 50%. In the present invention involving finely divided particles the silica assists the sintering, i.e., it renders a "wetting" action between the silicide grains and the oxide grains.

As previously noted, it has been found that the composition of the oxide component and its percentage in the heat resistant material are interdependent to a certain degree. It has been found that substantially four different types of heat resistant materials may be manufactured having oxide components in percentages by weight as follows:

*Type I.*—Oxide component 1 to 4% of the material, composed of 1 to 4% of $SiO_2$ and 0 to ½% $Al_2O_3$.
*Type II.*—Oxide component 4 to 20% of the material, composed of 4 to 20% $SiO_2$ and 0 to 3% $Al_2O_3$.
*Type III.*—Oxide component 25 to 35% of the material, composed of 1 to 10% $SiO_2$ and 15 to 34% $Al_2O_3$.
*Type IV.*—Oxide component 35 to 65% of the material, composed of 20 to 60% $SiO_2$ and 5 to 20% $Al_2O_3$.

In the materials of types I–IV listed above, the maximum allowable operating temperature is reduced from 1700° C. for material type I, via 1600° C. for material of type II, to 1400° C. to 1500° C. for materials of types III and IV. The reduction in allowable operating temperatures appearing between types I and IV is a result of the increasing oxide contents between types I and IV.

Material I is subject to a considerable grain growth and will therefore be brittle, whereas, material II is subject only to an insignificant grain growth and maintains a good mechanical strength also after a very long time of use.

The materials III and IV have, due to their high oxide content, a considerably higher resistance than the materials I and II which compensates somewhat for the lower operating temperature. Materials of type IV have high specific electrical resistance. The upper limit of the oxide component is 65% due to the fact that the material must have a practical degree of electrical conductivity.

While, as previously described, materials I–IV having specific compositions of oxide component as set forth, are desirably employed, the invention relates generally to materials including from 1 to 65% oxide component of which $Al_2O_3$ may be from 0 to 34% and $SiO_2$ from 1 to 65%. Materials with high oxide contents are difficult to manufacture with low porosity and, with respect to materials of type IV, it is necessary to add substances such as alkaline silicate or boric acid which reduces the melting point of the silica. The quantity of alkaline silicate may be from ½ to 5% by weight of the material (counted as pure $SiO_2$ in the water glass). At the high sintering temperatures these silicates are decomposed and leave only pure silica which will be included in the oxide component.

Also other substances reducing the melting point of silica or the oxide component respectively may be used in producing said materials having a high oxide content. As additional substances reducing the melting point of silica may be counted also such impurities, for instance, CaO, MgO, TiO$_2$, Fe$_2$O$_3$, Na$_2$O et cetera, which normally occur in natural and synthetical materials rich in silica.

Products employing the material according to the present invention may be manufactured according to usual powder metallurgical methods by forming a powder mixture and sintering it.

In exceptional cases so called pressures sintering in graphite forms may be used advantageously. The type of atmosphere of sintering has a critical influence on the result. If a powder of pure MoSi$_2$ is sintered in an inert gas or in hydrogen which only includes traces of oxidizing gases, for instance, less than 0.1% by volume of oxygen, there is no provable oxidation of the molybdenum disilicide and in any case there is formed less SiO$_2$ than 1% by weight of the material and the material obtained will fall outside the scope of the present invention. If the sintering of the silicide takes place in an atmosphere which includes higher content of an oxidizing gas, such as water vapor, there will occur a definite oxidation the degree of which is determined by temperature and time and the composition of the gas and also of the shape and size of the grains et cetera of the bodies to be sintered. For instance, it has been found that a protecting atmosphere having 99% by volume of hydrogen and 1% by volume of water vapor is capable of oxidizing at 1600° C. a body consisting of pure MoSi$_2$ and having a maximum grain size of 8 microns to an extent which gives a final product having the composition 98% MoSi$_2$ and 2% SiO$_2$. The sintering time is in this case 5 minutes and inasmuch as the sintered bodies already after this time were without any provable porosity there did not occur any further provable oxidation after a further sintering for a long time. If the sintering is made instead at 1500° C. it takes a longer time to close the pores and the degree of oxidation after 20 minutes in said gas is seen from a composition of 4% by weight of SiO$_2$ and the balance MoSi$_2$. However, it is not suitable to sinter too long in hydrogen, because then certain undesirable reactions may take place. Similar results may be obtained with other protective atmospheres consisting of 99% inert gas such as argon and 1% water vapor or oxygen. A microscopic examination has revealed that the silica formed extends substantially along narrow paths between the silicide crystals and appears to a very small extent in the form of discrete silica grains. The wetting action between silica and silicides has been proved to be very good and the silica has a clear function of preventing the grain growth. In the molybdenum disilicide which was sintered in the pure inert atmosphere and in which the silica content was less than 1% in the final products, the quantity of this silica is insufficient to form thin layers between the silicide grains and there will be almost no effect of assisting sintering. If the original powder mixture in addition to MoSi$_2$, also includes TaSi$_2$ or TiSi$_2$ or an oxide such as Al$_2$O$_3$ or aluminium silicate or silica the result obtained in sintering in a protecting atmosphere which is not entirely pure will be as above stated. On the other hand, if the sintering is made in an atmosphere including higher contents of water vapor or oxygen the oxidation will be correspondingly more intense which may be ascertained thereby that individual silica grains occur in the final product. The sintering may then also be carried out in two steps, for instance, a first sintering step within the temperature range from ordinary room temperature up to 1300° C. performed in a very pure protective atmosphere, an intermediate product being then obtained having about 20% by volume of pores. This intermediate product is then sintered in the second sintering step which may be performed in ordinary air so that a rather considerable oxidation takes place appearing partly in the formation of layers of SiO$_2$ which further the sintering between the silicide grains and, as a case may be, also between the oxide and silicide grains and partly as free silica in larger grains. The above material of type II is preferably manufactured in such a way that molybdenum disilicide to which is added silica and, if desired, tantalum disilicide, titanium disilicide and/or alumina, is mixed with a few percent of silica or, if desired, aluminium silicate and is pressed to a suitable shape and is sintered in a protective gas having about ½% oxygen at a temperature rising to 1300° C. and then further sintered in air up to a temperature of 1600° C. Products of the types I and III should be sintered at such a high temperature as possible, i.e. about 1700° C., and in a pure atmosphere containing in addition to inert gases only at most 1% by volume of oxygen. In producing the product of type I the silica formed is sufficient to facilitate sintering, whereas as regards the product III the high percentage of alumina prevents an efficient sintering and thus a higher temperature is required.

Heat resistant products employing the materials may be formed in several different ways, i.e., by cold pressing of rods, by extrusion of rods or tubes and by pressure sintering, preferably in graphite forms, of rods or in the shape of other objects having small dimensions. In the extrusion a temporary binding means, such as wax or paraffin, may be added which makes the mass supple. Such plastifying additions may be advantageously used which contain Si and which, upon oxidation and/or heating, remain in the heat resistant material as SiO$_2$. Such an addition is alkaline silicate which, upon heating, is transformed to SiO$_2$. Another is organic silicate, such as ethyl silicate, which upon hydrolysis, affords a finely divided or colloidal hydrate of SiO$_2$ having a favorable influence on the progress of the sintering in which it is transformed into SiO$_2$. Also other finely divided binding means containing silica may be used. Extruded heating elements are preferably formed with an incandescent zone of small cross section and adjacent terminal zones of larger dimensions. Elements being cold pressed and pressure sintered may be brought into the desired shape by mechanical working and may be provided with cold terminal zones having larger cross sectional dimensions.

Materials of type I find their application in small furnaces and apparatus in which the operating temperature is very high. The considerable growth of the grain size of the material and its small mechanical strength confines, however, the application of this material to very special cases.

Materials of type II may be extruded to very long strings and be shaped to almost any type of element, such as loops, meanders, spirals etc. The material has a good mechanical strength and a small growth of grain and may thus be used also in average sized and large furnace plants. The moderate content of oxides in the types I and II has but an insignificant influence on the specific electrical resistance which at 1600° C. amounts to 3 to 5 ohms mm.$^2$/m. in both cases. The specific resistance at ordinary room temperature varies between 0.3 and 1.0 ohm and is higher in case the silicide component includes TiSi$_2$ or TaSi$_2$.

Material of the type III is of particular advantage whenever there are high demands on a good resistivity against temperature shocks. The coefficients of thermal expansion in respect of the two substances Al$_2$O$_3$ and MoSi$_2$ are practically identical and due thereto the resistivity of the product against fluctuations in temperature will be good. Material of type III is manufactured only in very small dimensions which has connection with the limited possibilities of the pressure sintering method from a practical and economical point of view.

Material of type IV having substantially $SiO_2$ as its oxide component has a good resistivity against temperature shocks, because silica is present in the form of glass having a very low coefficient of thermal expansion. Materials of this type may be extruded to strings of great length. Due to its high oxide content the mechanical strength of this material is small and it will substantially be used in bodies of small dimensions, in which the high resistance may be utilized.

Following are listed four different practical examples of producing different materials falling within the types I to IV.

C. a resistance of 2 ohms which, at a terminal voltage of 12 volts, corresponds to a developed heat power of 72 watts.

Whereas in respect of Example 3 the specific electrical resistance at room temperature is 200 ohms $mm.^2/m.$ as stated above said resistance will be as much as 8000 ohms in respect of Example 4. Considering the fact that the oxide component in Example 3 is 43% and, in the Example 4, 48% by weight of the material it is clearly understood that in this range the material rapidly goes over from being a conductor to being an electrical insulator. The upper limit for the oxide component of 65% is thus also the limit for a material having any appreciable electrical conductivity as stated in conjunction with Table A.

Table A

| Powder mixture | Maximum size of grain, μ | Example No. 1 | 2 | 3 | 4 |
|---|---|---|---|---|---|
| | | Percent by weight | | | |
| $MoSi_2$, smelted [1] | 9 | 48 | | | |
| $MoSi_2$, sintered [2] | 5 | 50 | 85 | 60 | 55 |
| Smelted corundum (99% $Al_2O_3$) | 10 | | | | |
| δ—$Al_2O_3$ (from $Al_2SO_4$) | <1 | ½ | | 10 | 10 |
| Calcined chamotte [3] | 6 | | | | |
| Smelted mullite [4] | 8 | | 15 | | |
| Silica-filler (98% $SiO_2$) | <1 | 1½ | | 30 | 35 |
| Kind of forming | | Cold pressing 6000 kg./cm.² | See below. | String pressing binding medium.[5] | Cold casting binding medium.[6] |
| Pre-sintering: | | | | | |
| Atmosphere | | $H_2$+0.2% by vol. $O_2$. | See below. | | |
| Maximum temperature, °C | | 1,200 | See below. | | |
| Corresponding time, in minutes | | 30 | See below. | | |
| Final sintering: | | | | | |
| Atmosphere | | $H_2$+0.5% by vol. $O_2$. | Pressure sintering in graphite form 150 kg./cm.² | $H_2$+0.5% by vol. $O_2$. | $H_2$+0.5% by vol. $O_2$. |
| Maximum temperature, °C | | 1,650 | 1,500 | 1,450 | 1,450 |
| Corresponding time, in minutes | | 5 | 2 | 20 | 20 |
| | | Percent by weight | | | |
| Sintered-product: | | | | | |
| $MoSi_2$ | | 96 | 78 | 57 | 52 |
| $Al_2O_3$ | | ½ | 10 | 9 | 9 |
| $SiO_2$ | | 3½ | 12 | 34 | 39 |
| | | Percent by volume | | | |
| Porosity | | 5 | 7 | 6 | 9 |
| Type of material | | I | | IV | IV |

[1] Produced by smelting in electric arc furnace and in argon.
[2] Produced by reaction in hydrogen gas at 1,100° C. on a mixture of Mo-powder and Si-powder, the latter consisting of 97% Si and 2% Fe.
[3] Consisting of 35% $Al_2O_3$, 60% $SiO_2$ and the remainder of impurity.
[4] Consisting of 70% $Al_2O_3$, 25% $SiO_2$ and the remainder of impurity.
[5] Besides temporary softening means, to 100 grams powder mixture are added 3 grams $SiO_2$ in form of hydrated silica and water to suitable consistency.
[6] To 100 grams powder mixture is added 4 grams $SiO_2$ in form of hydrated silica. Water added to casting consistency.

The material according to the above Example 3 has a specific electrical resistance of 200 ohms at ordinary room temperature and 1000 ohms at 1000° C. and may be used, for example, for cigar lighters in motor cars. A small plate having the dimensions 5 by 10 by 1 millimetres and thicker terminals has, for instance, at 1000°

On the attached drawing there is plotted a logarithmic curve the ordinate indicating the $^{10}$log of the specific resistance as a function of the oxide component content being represented by the abscissa.

Below a Table B follows indicating nine further examples of the invention.

TABLE B

| Example No | 5 | 6 | 7 | 8 |
|---|---|---|---|---|
| Powder mixture, percent by weight | Maximal grain size, μ | | | |
| Ti-Si, 78% Si | 4 | | | 26 |
| TiSi₂, 54% Si | 8 | | | |
| Ti-Si, 8% Si | 10 | | 20 | |
| Zr-Si, 75% Si | 8 | | 45 | |
| VSi₂, 52% Si | 6 | 100 | | |
| V₃Si₃, 25% Si | 8 | | | |
| TaSi₂, 24% Si | 8 | | | |
| Ta₅Si₃, 9% Si | 10 | | | |
| CrSi₂, 50% Si | 6 | | 18 | |
| MoSi₂, 37% Si | 5 | | 15 | 70 |
| MoSi, 12% Si | 10 | | | 34 |
| Al₂O₃ (smelted corundum) | 30-50 | | | |
| Al₂O₃ (Al₂SO₄ 700° C.) | <1 | | 8 | |
| BeO | 10 | | | 10 |
| ZrO₂ | 10 | | | |
| Y₂O₃ | 10 | | 15 | |
| SiO₂-glass | 8 | | 1 | 4 |
| SiO₂-glass +5% MoO₃ | 8 | | 4 | 30 |
| Kind of forming | Cold pressing at 4,000 kg./cm.² | | | |
| Presintering | At 1,000 to 1,200° C. in pure protective gas (H₂ or Argon+0.2% by volume O₂). Mechanical working if desired. | | | |
| Final sintering: Atmosphere | H₂+0.8% by volume O₂ | Air | H₂+0.2% by volume O₂ | |
| Maximal temperature °C | 1,600 | 1,500 | 1,650 | 1,550 |
| Duration of maximal temp., minutes | 5 | 15 | 10 | 15 |
| Final product: Silicide component, percent by weight | 96 | 72 | 87 | 57 |
| Composition of silicide, component, percent by weight: | | | | |
| Ti | | 25 | | 10 |
| Zr | | 16 | | |
| V | 50 | | | |
| Ta | | | | |
| Cr | | | 10 | |
| Mo | | 12 | 50 | 50 |
| Si | 50 | 47 | 40 | 40 |
| Composition of oxide component, percent by weight | 4 | 28 | 13 | 43 |
| Thereof parts Al₂O₃ | | | 8 | |
| Thereof parts BeO | | | | 10 |
| Thereof parts Y₂O₃ | | 1 | | |
| Thereof parts ZrO₂ | | 14 | | |
| Thereof parts SiO₂ | 4 | 13 | 5 | 33 |

Example 9

| Powder mixture | Percent by weight | Maximum size of grain, microns |
|---|---|---|
| TiSi₂ (54% Si) | 55 | 8 |
| TaSi₂ (24% Si) | 5 | 8 |
| MoSi₂ (37% Si) | 30 | 5 |
| Y₂O₃ and other rare earths | 5 | 10 |
| SiO₂ glass plus 5% MoO₃ | 5 | 8 |

Kind of forming: Addition of wax plus Na water glass and extrusion.
Presintering: At 1,200° C. in H₂ plus 0.2% by volume of O₂.
Final sintering:
　Atmosphere H₂+0.8 by volume of O₂.
　Maximum temperature 1,500° C.
　Duration of maximum temperature, 10 minutes.

Final product, percent by weight:
　Silicide component _____ 85
　Ti _____ 30
　Ta _____ 2
　Mo _____ 20
　Si _____ 48
　Oxide component _____ 15
　Thereof Y₂O₃ and other rare earths _____ 5
　SiO₂ _____ 10

Example 10

| Powder mixture | Percent by weight | Maximum size of grain, microns |
|---|---|---|
| TiSi₂ (54% Si) | 10 | 8 |
| MoSi₂ (37% Si) | 55 | 5 |
| MoSi (12% Si) | 5 | 10 |
| Al₂O₃ (Al₂SO₄ 700° C.) | 5 | <1 |
| SiO₂-glass plus 5% MoO₃ | 25 | 8 |

Kind of forming: Addition of wax plus Na water glass and extrusion.
Presintering: At 1,200° C. in H₂ plus 0.2% by volume of O₂.
Final sintering:
　Atmosphere, air.
　Maximum temperature, 1,600° C.
　Duration of maximum temperature, 3 minutes.

Final product, percent by weight:
　Silicide component _____ 60
　Ti _____ 8
　Mo _____ 56
　Si _____ 34
　Oxide component _____ 40
　Thereof Al₂O₃ _____ 5
　Thereof SiO₂ _____ 35

Example 11

| Powder mixture | Percent by weight | Maximum size of grain, microns |
|---|---|---|
| VSi₂ (52% Si) | 25 | 6 |
| TaSi₂ (24% Si) | 25 | 8 |
| SiO₂-glass | 20 | 8 |
| SiO₂-glass plus 5% MoO₃ | 30 | 8 |

Kind of forming and final sintering:
　Pressure sintering in graphite form 150 kgs./cm.².
　Maximum temperature, 1,550° C.
　Duration of maximum temperature, 4 minutes.

Final product, percent by weight:
　Silicide component _____ 50
　V _____ 24
　Ta _____ 38
　Si _____ 38
　Oxide component _____ 50
　Thereof SiO₂ _____ 50

Example 12

| Powder mixture | Percent by weight | Maximum size of grain, microns |
|---|---|---|
| TaSi₂ (24% Si) | 15 | 8 |
| Ta₅Si₃ (9% Si) | 10 | 10 |
| MoSi₂ (37% Si) | 5 | 5 |
| MoSi (12% Si) | 6 | 10 |
| Al₂O₃ (Al₂SO₄ 700° C.) | 8 | <1 |
| BeO | 47 | 10 |
| ZrO₂ | 5 | 10 |
| SiO₂-glass plus 5% MoO₃ | 4 | 8 |

Kind of forming and final sintering:
　Pressure sintering in graphite form 150 kgs./cm.².
　Maximum temperature, 1,500° C.
　Duration of maximum temperature, 4 minutes.

Final product, percent by weight:
　Silicide component _____ 36
　Ta _____ 57
　Mo _____ 23
　Si _____ 20
　Oxide component _____ 64
　Thereof Al₂O₃ _____ 8
　Thereof BeO _____ 47
　Thereof ZrO₂ _____ 5
　Thereof SiO₂ _____ 4

Example 13

| Powder mixture | Percent by weight | Maximum size of grain, microns |
|---|---|---|
| TiSi₂ (54% Si) | 20 | 8 |
| V₃Si₃ (25% Si) | 5 | 8 |
| Mo-Si (12% Si) | 10 | 10 |
| Al₂O₃ (fused corundum) | 55 | 30-50 |
| Al₂O₃ (Al₂SO₄ 700° C.) | 5 | <1 |
| SiO₂-glass plus 5% MoO₃ | 5 | 8 |

Kind of forming and final sintering:
　Pressure sintering in graphite form 150 kgs./cm.².
　Maximum temperature, 1,400° C.
　Duration of maximum temperature, 4 minutes.

Final product, percent by weight:
　Silicide component _____ 35
　Ti _____ 26
　V _____ 11
　Mo _____ 25
　Si _____ 38
　Oxide component _____ 65
　Thereof Al₂O₃ _____ 60
　Thereof SiO₂ _____ 5

Example 14

100 parts of molybdenum disilicide powder having grain sizes finer than 10 microns are mixed with silica hydrate corresponding to 5 parts of silica, 5 parts of paraffin and water added to suitable workability. The plastic mixture is worked 48 hours under vacuum and extruded. The extruded rods, 7 and 14 mm. respectively, are dried and pre-sintered under pure hydrogen up to 1000° C. The rods are then pushed through a furnace under pure hydrogen at 1300–1400° C. and after that treatment they have strength enough to be handled. The porosity is now about 20% by volume and the technical composition corresponds to the raw materials used.

The rods are now sintered a few minutes in air at 1600° C. by means of direct current heating. Because of the silica addition the material can be formed by hand at 1600° C. into any desired shape. The heating in air gives a product with 0–5% porosity and a fair strength. The material is however oxidized to an extent, which corresponds to the formation of about 6% by weight $SiO_2$, which is formed from the silicide. The sintered product therefore contains 2 different phases: $MoSi_2$ and quartz glass. After a few hours at 1500–1600° C. some reaction takes place. The practical result of this reaction is that the material cannot be formed any more and thus retains its shape.

One of the most important properties of these elements is that they are completely surrounded by a very thin layer of quartz glass, which is formed when the rods are sintered in air above 1200° C. It is therefore very important that the cooler ends are also heated in oxidizing atmospheres before the welding operation.

As seen above the material of the elements contains a ceramic phase corresponding to about 10% by weight of the material. This ceramic phase is very important as it effectively stops the grain growth of the silicide.

The use of molybdenum disilicide in admixture with $SiO_2$, $Al_2O_3$ or combinations thereof in fine particle size and in certain proportions to manufacture a material adapted to be used at elevated temperatures by sintering in a certain type of atmosphere, and the use of certain materials and techniques in the manufacture of such product, disclosed but not claimed in the present application, are disclosed and claimed in the copending application Serial No. 657,058, filed May 6, 1957, of Nils Gustav Schrewelius and Karl Herbert Joachim Medin, said Medin being the sole inventor of the present application and said copending application being owned by the same assignee as the present application.

What I claim is:

1. A process for making sintered refractory metal silicide material, said process comprising mixing an organic silicate with at least one of the refractory metal silicides of the metals of the group consisting of Ti, V, Mo and W, said silicide material having an average particle size less than about 10 microns, and hydrolyzing and sintering the resultant mixed material, said sintering being carried out in an atmosphere selected from a group consisting of the noble gases, hydrogen and such gases containing small amounts of an oxygen-containing gas, said silicate producing a fine dispersion of silica particles upon heating during said sintering, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

2. A sintered refractory metal silicide material, said material consisting essentially of silica and at least one of the refractory metal silicides of the metals of the group consisting of Ti, V, Mo and W, said material having been hydrolyzed and sintered from a powder mixture thereof having an average particle size less than about 10 microns, containing silica in the form of an organic silicate, said sintering having been carried out in an atmosphere selected from a group consisting of the noble gases, hydrogen and such gases containing small amounts of an oxygen-containing gas, said silicate producing a fine dispersion of silica particles upon heating during said sintering, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

3. The process of claim 1 in which the organic silicate is ethyl silicate.

4. A process for making sintered refractory metal silicide material, said process comprising mixing silica with at least one of the refractory metal silicides of the metals of the group consisting of Ti, V, Mo and W, and alkali metal ions in an amount sufficient to lower the melting temperature of said silica, said silicide material having an average particle size less than about 10 microns, and sintering the resultant mixed material, said sintering being carried out in an atmosphere selected from a group consisting of the noble gases, hydrogen and such gases containing small amounts of an oxygen-containing gas, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

5. A sintered refractory metal silicide material, said material consisting essentially of silica and at least one of the refractory metal silicides of the metals of the group consisting of Ti, V, Mo and W, said material having been sintered from a powder mixture thereof having an average particle size less than about 10 microns containing alkali metal ions in an amount sufficient to lower the melting temperature of said silica, said sintering having been carried out in an atmosphere selected from the group consisting of the noble gases, hydrogen and such gases containing small amounts of an oxygen-containing gas, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

6. A process for making sintered refractory metal silicide material, said process comprising mixing silica with at least one of the refractory metal silicides of the metals of the group consisting of Ti, V, Mo and W, and boric acid in an amount sufficient to lower the melting temperature of said silica, said silicide material having an average particle size less than about 10 microns, and sintering the resultant mixed material, said sintering being carried out in an atmosphere selected from a group consisting of the noble gases, hydrogen and such gases containing small amounts of an oxygen-containing gas, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

7. A sintered refractory metal silicide material, said material consisting essentially of silica and at least one of the refractory metal silicides of the metals of the group consisting of Ti, V, Mo and W, said material having been sintered from a powder mixture thereof having an average particle size less than about 10 microns containing boric acid in an amount sufficient to lower the melting temperature of said silica, said sintering having been carried out in an atmosphere selected from the group consisting of the noble gases, hydrogen and such gases containing small amounts of an oxygen-containing gas, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

8. A sintered refractory metal silicide material, said material consisting essentially of silica and at least one of the refractory metal silicides of the metals of the group consisting of Ti, V, Mo and W, and at least one ion of the group consisting of Mo, W and V in an amount sufficient to lower the surface tension of said silica, said material having been sintered from a powder mixture thereof having an average particle size less than about 10 microns, said sintering having been carried out in an atmosphere selected from a group consisting of the noble gases, hydrogen and such gases containing small amounts of an oxygen-containing gas, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

9. A process for making sintered refractory metal silicide material, said process comprising mixing silica with at least one of the refractory metal silicides of the metals of the group consisting of Ti, V, Mo and W, and at least one ion of the group consisting of Mo, W and V in an amount sufficient to lower the surface tension of said silica, said silicide material having an average particle size less than about 10 microns, and sintering the resultant mixed material, said sintering being carried out in an atmosphere selected from a group consisting of the noble gases, hydrogen and such gases containing small amounts of an oxygen-containing gas, the amount of said silicide and of said silica being such as to facilitate the sintering of the powder without rendering the sintered powder electrically non-conductive, said silicide component constituting 99 to 35% by weight of the material and said silica constituting 1 to 65% by weight of the material, said material being resistant to prolonged temperatures in the range 1500–1700° C. in air and having a porosity not greater than 10%.

References Cited in the file of this patent

UNITED STATES PATENTS 2,747,260    Carlton et al. _____ May 29, 1956

FOREIGN PATENTS 674,137    Great Britain _____ June 18, 1952

UNITED STATES PATENT OFFICE
CERTIFICATE OF CORRECTION

Patent No. 3,027,332.  March 27, 1962

Karl Herbert Joachim Medin

It is hereby certified that error appears in the above numbered patent requiring correction and that the said Letters Patent should read as corrected below.

Column 4, line 35, for "20 microns" read -- 10 microns --.

Signed and sealed this 10th day of July 1962.

(SEAL)
Attest:

ERNEST W. SWIDER
Attesting Officer

DAVID L. LADD
Commissioner of Patents